USOO5745749A

United States Patent [19]
Onodera

[11] Patent Number: 5,745,749
[45] Date of Patent: Apr. 28, 1998

[54] METHOD AND SYSTEM OF FILE VERSION CLUSTERING OF OBJECT BLOCKS USING A COMPILER AND DATABASE AND HAVING A PREDETERMINED VALUE

[75] Inventor: Tamiya Onodera, Yokyo-to, Japan

[73] Assignee: International Business Machines Corp., Armonk, N.Y.

[21] Appl. No.: 493,087

[22] Filed: Jun. 21, 1995

[30] Foreign Application Priority Data

Jun. 27, 1994 [JP] Japan .................................. 6-414443

[51] Int. Cl.⁶ ........................................ G06F 17/30
[52] U.S. Cl. .............................. 395/612; 395/611
[58] Field of Search ............................ 395/600, 700, 395/491.02, 601, 425, 611, 612, 708; 364/200

[56] References Cited

U.S. PATENT DOCUMENTS

| | | | |
|---|---|---|---|
| 5,021,946 | 6/1991 | Korty | 364/200 |
| 5,390,315 | 2/1995 | Blandy et al. | 395/425 |
| 5,410,671 | 4/1995 | Elgamal et al. | 395/425 |
| 5,454,102 | 9/1995 | Tang et al. | 395/600 |
| 5,454,103 | 9/1995 | Coverston et al. | 395/600 |
| 5,479,656 | 12/1995 | Rawlings, III | 395/497.02 |
| 5,481,702 | 1/1996 | Takahashi | 395/600 |
| 5,504,887 | 4/1996 | Malhotra et al. | 395/600 |
| 5,560,015 | 9/1996 | Onodera | 395/708 |
| 5,574,907 | 11/1996 | Jernigan, IV et al. | 395/601 |

OTHER PUBLICATIONS

"Special Report: Digital Equipment Corporation's Open Client/Server Offerings", The OSINetter Newsletter, Aug. 1994,v9, n8, p. 28(1).

Goulde, Michael A. "The Unix Data Center: Fact or Fiction?", Open Information Systems, Dec. 1992, v7, n12, p. 3(31).

McDonald, M. Shane "Improving File System Performance by Dynamically Restructuring Disk Space", Computers and Communications, 1989 Int'l Phoenix Conf., p. 264(8).

Primary Examiner—Thomas G. Black
Assistant Examiner—Charles L. Rones
Attorney, Agent, or Firm—Edward H. Duffield

[57] ABSTRACT

To improve the efficiency in space of per-file clustering. According to the multiple version clustering of this invention, the difference which occurred from modification to the program information of a single source file is initially added to the same cluster as the one holding, the program information of the original source file. This is similar to per-file clustering. What is different from per-file clustering is that each time a difference is added, the amount of the difference is determined by units of byte, for example. Then, in accordance with the invention, in response to the occurrence of the amount of difference accumulation exceeding a predetermined amount, another cluster is created. At this time, the separate cluster will not accommodate another difference, but the entire program information of the modified source file. Differences brought by further modifications are accumulated not in the old cluster, but in the new cluster.

21 Claims, 5 Drawing Sheets

Multiple version clustering

```
Class A {
    int a;
};

class B: public A {
    int b;
};
```

Sample C++ program

FIG. 1

Representation using objects of program information of FIG. 1

FIG. 2 a.out is created from a.c, b.c, and a.h.

Per - version clustering

METHOD AND SYSTEM OF FILE VERSION CLUSTERING OF OBJECT BLOCKS USING A COMPILER AND DATABASE AND HAVING A PREDETERMINED VALUE

FIELD OF THE INVENTION

This invention relates generally to a method and system for clustering in computer accessible storage media such as disk storage, and particularly to a method for clustering of program databases used for development and maintenance of programs.

DESCRIPTION OF THE PRIOR ART

Generally, a single program consists of a number of files, a single file includes many program elements, and there are various complex relationships between program elements. A program element refers to, for example, a function, variable, class, or class member. Relationships between program elements includes that, for example, class A is a parent of class B, member m belongs to class C, or variable v is referenced in function f.

It is important in developing, understanding, and maintaining programs to capture the relationships between these program elements. As a huge program is developed, capturing such relationships becomes more and more important and at the same time further difficult. To facilitate the task of capturing such relationships, support tools, typically a "source code browser", have been designed and implemented.

These support tools are based on a "program database", which stores program elements and their relationships. On demand by the user, a support tool, which is a "client" of the database, references this database appropriately to extract necessary information.

Figure 1:
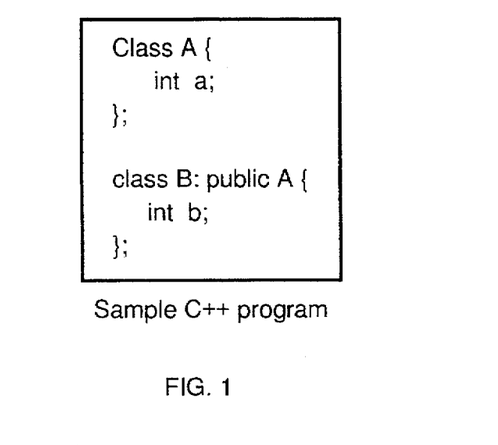
FIG. 1 shows a sample program of C++.
Figure 2:
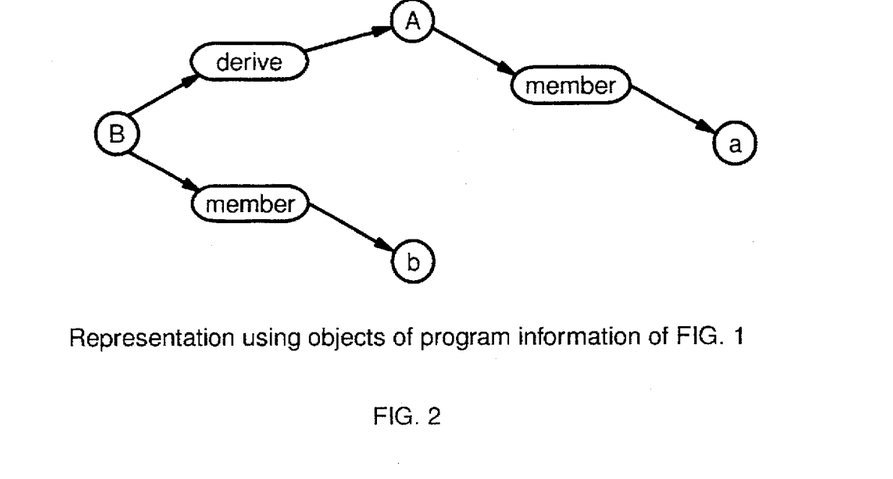
FIG. 2 shows a representation using objects of the program information shown in FIG. 1.

Recently, an object-oriented technique has been considered as a basis for constructing program databases. In such cases, a single program element in a database is represented generally as a single "object" and the relationship between the elements as a "link" between the objects. For such cases that this database is implemented with a C++ language, an object would be provided as a "class instance" and link provided as a "pointer". FIG. 2 shows an example of such program database, representing the program information of the C++ program shown in FIG. 1. According to the program of FIG. 1, a variable called a is a member variable of class A, class B is derived from class A, and a variable called b is a member variable of class B.

In the above description, an "origin" may be considered for an object. That is, a file which includes the program element represented by the object is called the origin of the object.

A general description will now be given for clustering. This description is not specific to program databases, but relates to more general disk management techniques.

Typically, a database is stored in a secondary storage, such as a hard disk. When a client accesses data in the database, it will move the data into a central or primary storage, such as RAM. The secondary storage is managed typically as a set of 4 to 8 kilobyte blocks, which are units of transfer between the primary and secondary storage. Generally, block transfer between the primary and secondary is relatively slow in a computer system. Thus, if a program frequently transfers data between the primary and secondary storage, the program will spend most of its time in this block transfer, and therefore none of its own task will proceed. This is what is called "slashing".

"Clustering" refers to placing object groups which are possibly accessed consecutively in time so as to be physically close with each other. Such closely placed data groups are said to have formed a "cluster". The meanings of close placement of objects A and B can be specifically described as follows:

1) Place them in the same block.

2) If the step 1) is not possible, reduce the time of seeking from the block where A is placed to the block where B is placed to minimum whenever possible.

These process steps will reduce the number of block transfers and the time of transfer, thus allowing applications to run more efficiently.

A general method for implementing clustering will be described. Also this method is not particularly relevant to program databases, but is a basic technique of this invention.

As noted above, a cluster is a set of "consecutive" blocks on secondary storage. As used herein, "consecutive" means that the next block can be reached in a minimum seek time, for instance, when hard disks are used.

It is contemplated that there are typically three methods for clustering:

1) Directly control the secondary storage.

2) Use the operating system's file system. For example, create a database as a file of Advanced Interactive Executive (AIX) (trademark of IBM) file system Microsoft Disk Operating System (MS-DOS), (trademark of Microsoft), or Operating System/2 (OS/2) OS/2 (trademark of IBM) FAT or OS/2 High Performance File System (HPFS) file system. Typically, these file systems allow for fast sequential access in constructing a single file in a secondary storage. Thus, close placement of two data items means that the placement is made so that the "offset from the beginning of a file" is small.

3) Use a database management system. In this case, use instructions typically provided by the management system for clustering data.

Clustering by file will now be described. This is a promising approach as a clustering technique for program databases. According to this technique, the following clusters are created.

1) Shared cluster: One shared cluster exists for one database. Objects which are shared among multiple files are placed in this cluster. In C language, for example, this type of object corresponds to the one which represents a function or global variable.

2) File cluster: One file cluster exists for one file. Those objects which are not shared among files are placed in a file cluster corresponding to the origin of the objects. In C language, for example, this type of object corresponds to the one which represents a local variable declared in the body of a function, or a class member.

Figure 3:
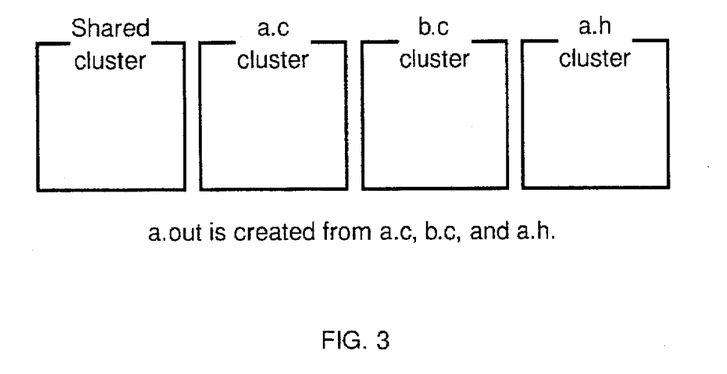
FIG. 3 illustrates a cluster group formed by storing the program information consisting of three files in accordance with per-file clustering.

FIG. 3 shows an example of clustering by file. In FIG. 3, assuming that a program called a.out consists of three source files: a.c, b.c, and a.h, these files are shown to be stored in separate clusters in accordance with per-file clustering.

Advantages and disadvantages which are inherent to per-file clustering can be summarized as follows:

a) Time of generation is short.

b) Object management is simple and efficient in time.

c) Object management is inefficient in space.

These aspects will be described in detail.

First, that the time required for generating a database in per-file clustering is short is because object sharing is facilitated among a number of versions of a file. Creating new objects for a database is not necessarily an inexpensive operation. Therefore, it would be better, if possible, to share existing objects for use. More particularly, assume that a file F is modified to yield an original version Fb and a modified version Fa. In per-file clustering, both objects from Fb and objects from Fa would be placed in cluster C corresponding to file F. Modifications to file F are, in many cases, made to a portion of the file. From this, the program information of Fa is often almost the same as that of Fb. In creating program information corresponding to Fa in cluster C, by creating in cluster C only differences with the program information corresponding to Fb, the program information can be created fast and efficiently.

Figure 4:
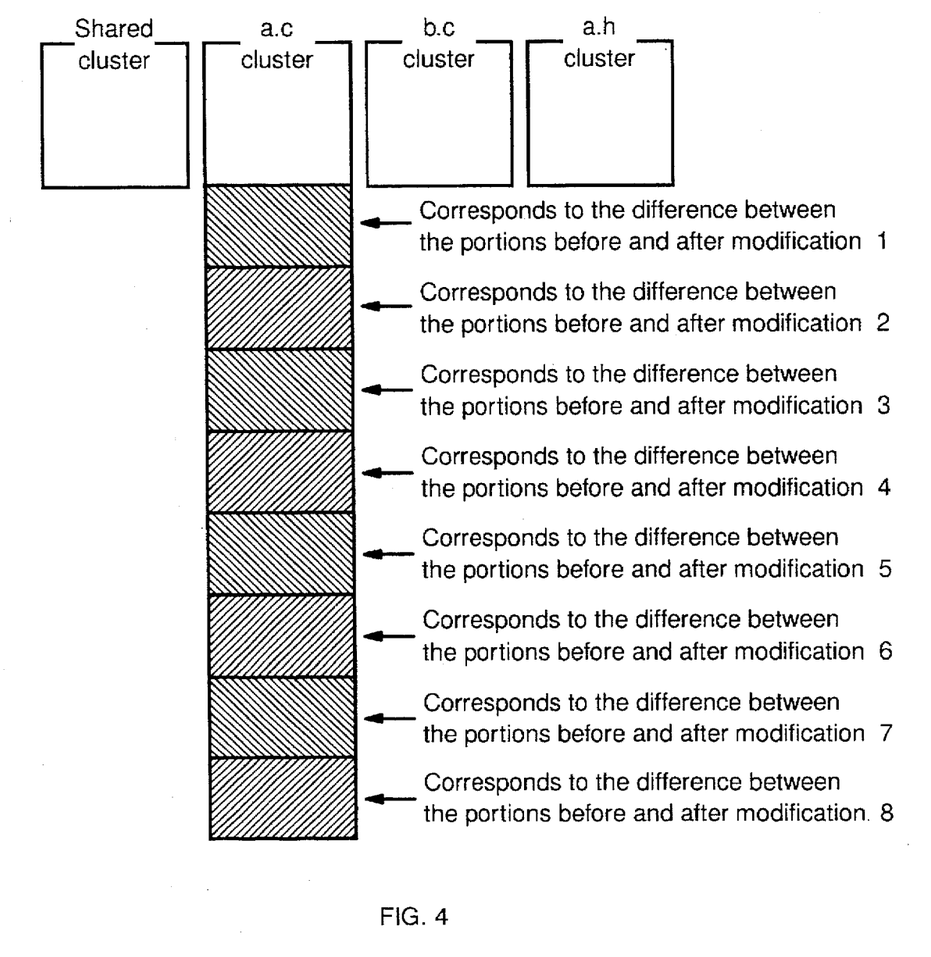
FIG. 4 illustrates the state of the cluster group after modification to a.c has been repeated eight times.

FIG. 4 shows the state of a database when a single file has been partially modified eight times in succession. In FIG. 3, as source file a.c is modified, differences between original and modified versions would be accumulated one after another in the same cluster as the one in which file a.c is stored, as shown in FIG. 4.

Now, characteristics of per-file clustering will be described in conjunction with object management. Object management in a database is to erase such objects that are no longer necessary. In the course of change and evolution of a program, there arise unnecessary objects in the database. The change and evolution of a program is largely a change in file organization of the program and partly modifications, additions, and deletions of program elements included in the file.

In per-file clustering, by determining the occasion of large change, i.e. change in file organization, objects can be managed. That is, if a particular file is removed from a program, then all the objects which are originated from that file are no longer necessary, and will be collectively reclaimed. This is because one cluster contains only one file. Thus, in per-file clustering, "object management" means "cluster management".

The implication of this is that object management can be easily implemented. Further, since an object-oriented database is typically provided with instructions for erasing clusters, only a small cost is incurred in erasing a substantial amount of objects, and object management can be highly efficient in time.

Assume that files have been edited iteratively with the file organization unchanged. Specifically, this is the case of iterative file editing where no file is dropped from the file organization. In such case, reclamation will not be activated and unnecessary objects are left intact. This is never a special case, but may continue more often than not for a relatively long period of time. It raises a serious problem that unnecessary objects reside without being reclaimed for an extended period.

This can be seen also from the example in FIG. 4. In FIG. 4, the portions being added to the cluster as differences caused by eight modifications can include the objects which represent the program portions that are eliminated from the source code by further modifications. Such objects still remain in the a.c cluster.

It is therefore an object of the present invention to solve the aforementioned problems involved in per-file clustering. It is another object of the present invention to improve efficiency in space by placing the program information of multiple file versions in a single cluster and by improving per-file clustering.

One of the extreme variations of per-file clustering can be considered to be "per-version clustering". With per-version clustering, since a new cluster is provided for each updated source program each time the source program is edited, consumption of clusters is large at this stage. On the other hand, in accordance with this technique, separate versions are stored as separate clusters. Therefore it is easy to discard old versions which have become unnecessary.

SUMMARY OF THE INVENTION

This invention combines the advantages of per-file clustering and per-version clustering to provide a "multiple version clustering" technique. According to the multiple version clustering of this invention, the differences incurred by modifications to a single source file are initially accumulated in the same cluster as that for the original source file. This processing is similar to per-file clustering. What is different from per-file clustering is that each time a difference is added, the amount of addition is determined by, for example, units of byte. Then, in response to the occasion where the amount of accumulated differences exceeds a predetermined value, another cluster is created in accordance with the invention. At this time, the new cluster will not accommodate any further differences without the entire source file being modified. Then, the differences caused by further modifications will be accumulated not in the old cluster, but in the new cluster.

This multiple version clustering overcomes the problem of per-version clustering that each time a program is modified a new cluster is created. Furthermore, since the cluster holding fairly old versions of program is present independently from the cluster holding the newest version of it, such old version of program can be easily removed in a collective manner, and thus the drawbacks of per-file clustering are eliminated.

DESCRIPTION OF THE PREFERRED EMBODIMENT

1. Hardware Configuration

Figure 5:
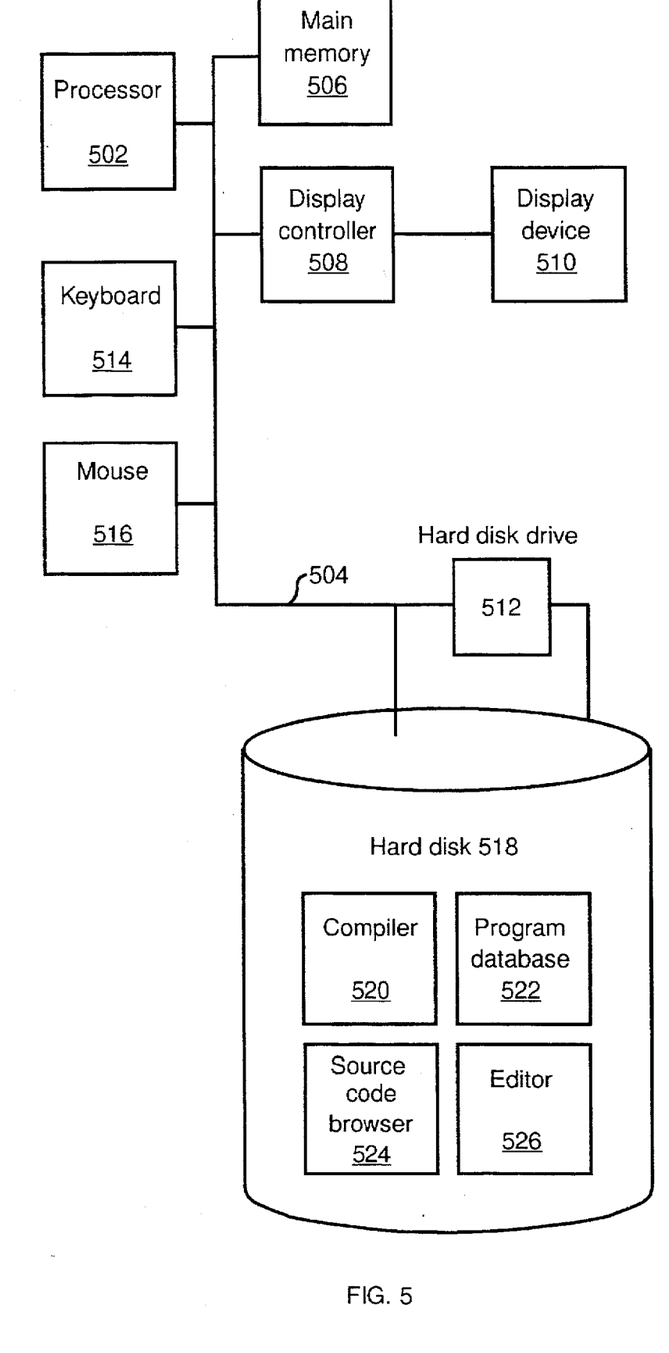
FIG. 5 is a block diagram of the hardware configuration of the system of the present invention.

Referring now to FIG. 5, the hardware configuration for carrying out this invention will be described. This hardware configuration is a typical one which comprises processor 502 for controlling arithmetic and input/output operations, main memory 506 connected to processor 502 via bus 504 for providing working and cache areas for loading programs and calculations, display device 510 connected to bus 504 via display controller 508 for displaying to the operator under control of processor 502 a computer-base or multi-window graphics screen, hard disk drive 512 connected to processor 502 via bus 504 which controls hard disks 518 storing an operating system such as IBM's AIX and OS/2 (Trademarks of IBM Corporation) and application programs such as compiler, debugger, and editor, keyboard 514 for inputting command computer strings to processor 502, and mouse 516 for giving instructions to processor 502 by pointing at desired locations on display device 510.

This hardware embodiment is directed to a program development environment, and thus hard disk drive 512 includes a program database, which contains the source file program information, which is managed by cluster in accordance with the technique of this invention. For this, any file system may be stored in the hard disks which permits cluster management, such as the AIX file system, OS/2 HPFS, and FAT employed in OS/2 (Trademarks of IBM) and MS-DOS (trademark of Microsoft). Briefly, it should be noted that the present invention is not limited to particular operating systems, but can be implemented under any operating system which incorporates a file system that enables cluster management.

The media for cluster management are also not limited to fixed storage media including a hard disk drive, but may be portable recording media, such as an optical disk drive and be any media to and from which information can be read and written.

2. System Components

To make up the system according to this invention, hard disk drive 512 shown in FIG. 5 includes the following:

(1) Compiler 520: It is contemplated that this compiler includes functions such as make, linker, and debugger. A compiler is primarily capable of compiling one or more source files to create an object program. In addition to such typical functions, compiler 520 is also capable of storing objects, including program elements, in a database in accordance with the multiple version clustering of this invention.

(2) Database 522 for storing the program information of source files by cluster management.

(3) Source code browser 524 for accessing program elements in database 522. This browser is provided to enable calls to particular program information in database 522 for browsing. It is also capable of displaying class inheritance diagrams in object-oriented languages such as C++.

(4) Program editor 526 for editing source files.

3. Per-Version Clustering

Figure 6:
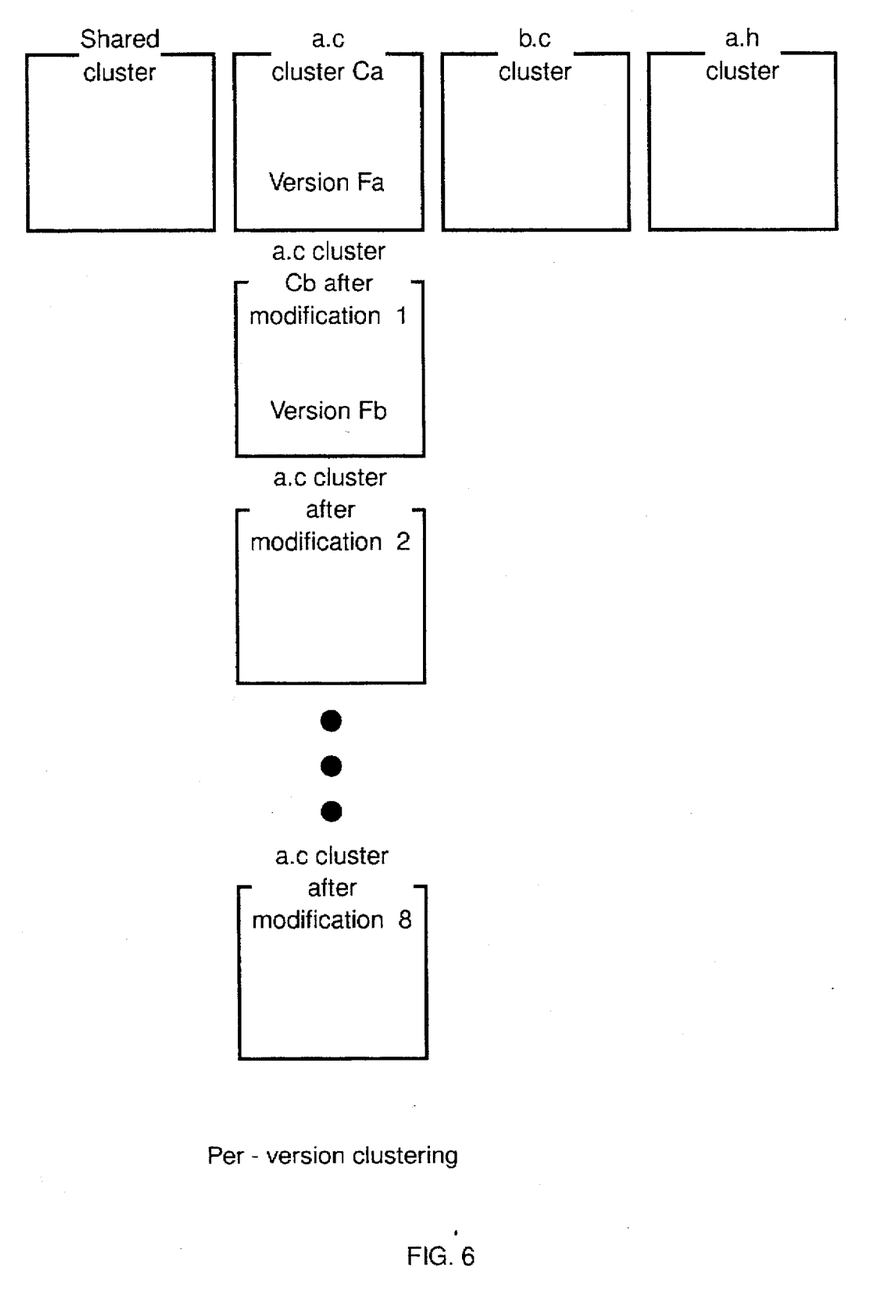
FIG. 6 shows cluster generation using per-version clustering.

Before proceeding to the description of the multiple version clustering of this invention, first "per-version clustering" as one of extreme variations of per-file clustering will be described with reference to FIG. 6, which replaces per-file clustering of FIG. 3 with per-version clustering. In per-version clustering, a new cluster is assigned for every file version. Assuming that in FIG. 6 a file a.c has been modified and its unmodified version taken as Fa and modified version as Fb, the objects which originates from Fb will be placed in one cluster Cb and the objects originating from Fa in another cluster Ca. Then, at the time when Fb is created and the objects are placed in Cb, Ca will become an unnecessary cluster and the rate of object reclamation would surely be high. That is, the efficiency in space of object management is significantly improved. However, every time a new version is created, all the information of the version must be stored from the beginning, which causes a significant impact on the time of generating a corresponding database.

4. Multiple Version Clustering

A promising compromise is the multiple version clustering suggested by this invention. In this technique, the objects from multiple versions of a single file will be retained in one cluster. The advantages of this are: 1) objects among some versions are shared to a substantial degree, and 2) even if the file organization of a program remains unchanged, the cluster holding unnecessary objects will not survive for long.

Figure 7:
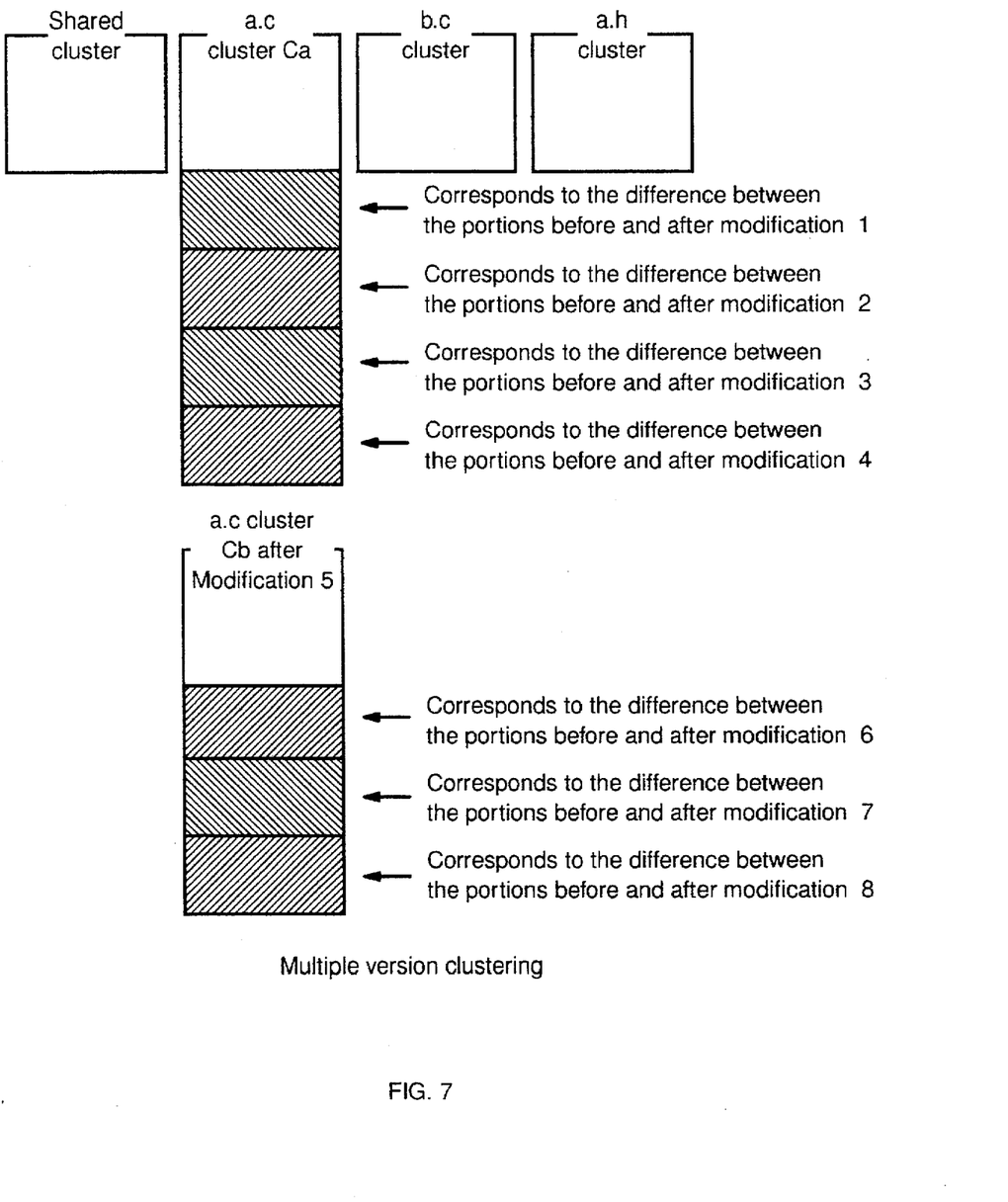
FIG. 7 illustrates how differences are accumulated in a cluster and a new cluster is created by the multiple version clustering according to the present invention.

FIG. 7 shows an example of multiple version clustering. Like FIG. 6, this example is a state of the database being modified. For illustrative purpose, it is assumed that a single file cluster retains program information of up to five versions. That is, cluster Ca for file a.c accumulates differences occurred by those up to the fourth modification, and when the fifth modification is made, a new cluster Cb is created, and a source file a.c which reflects the results of the fifth modification is stored in cluster Cb. Thereafter, differences by further modifications will be accumulated in cluster Cb. Unlike per-version clustering, as also seen from this example, there is no need to create a new cluster every time a new version is created. Furthermore, unlike per-file clustering, at the stage where the fifth modification is completed, the first a.c cluster can be reclaimed as garbage.

In the above example, it is assumed that a single file cluster can hold up to five versions. Such management as is based on the number of versions is considered to be effective under limited conditions. However, a more practical approach is not to fix the number of versions but to effect management by an increment of the cluster size. For example, assume that the size of cluster C when it holds its first version is S bytes, cluster C will continue to hold the new versions of file F until the size of C becomes $(1+a)S$ bytes, where a is a positive value. Although the smaller the value a the higher the rate of reclamation, the larger generation time will become. The larger the value a the less the generation time will be. With this feature of such management technique considered, a specific value should be determined to meet system requirement. Generally, a preferable value is $0.5 < a < 1$.

5. Procedure for Storing Objects in Database

For the compiler to perform compilation, it is necessary to read a separate source file to work on the objects included in the source file. In accordance with the invention, the procedure carried out by the compiler for processing file a.c and storing its program information is represented by pseudo codes as follows:

(1) Find the cluster for the objects originating from a.c as follows and take it as Ca.

[TABLE 1]

```
if (such cluster Cx already exists?) {
    if (the size of Cx exceeds the upper limit?)
        Create a new cluster and take it as Ca;
    else
        take Cx as Ca;
}
else
    Create a new cluster and take it as Ca;
```

(2) After cluster Ca for file a.c has been found by said processing, a process, as shown in the following pseudo codes, is repeated for each object o which represents the program information of a.c, to store the object in a given cluster.

[TABLE 2]

```
if (o is a shard object?)
    Take the shard object as Co;
else
    Take the stated Ca as Co;
if (an object which is equivalent to o already exists in Co?)
    Do nothing;
else
    Copy o to cluster Co;
```

As described above, in accordance with the present invention, by employing multiple version clustering, the cluster holding fairly old versions of program is present independently from the cluster holding the newest version of it. Thus, such old versions of program can be easily erased in a collective manner, and the drawbacks of per-file clustering are eliminated.

While the embodiment stated above has been described with reference to a program database, it is not intended to limit the scope of the invention to the program database, but the invention is applicable to any system which performs cluster management for computer storage media in order to store differences being made by editing and modifications.

What is claimed is:

1. A method for clustering in computer accessible storage media, said method comprising the step of;
   (a) storing a content of a file in a single cluster of said storage media;
   (b) in response to chance or modification of said file, storing a differences in storage space used by said file resulting from said change or modification in said cluster, so as to accumulate a sum of said differences in said cluster; and
   (c) in response to said accumulated sum of said differences exceeding a predetermined values generating a new cluster and storing the total content of said file in said new cluster of said storage media.

2. The clustering method according to claim 1, wherein said predetermined value is S(1+a), where S is the number of bytes of the file which is first to be stored in said single cluster and a is a positive real number.

3. The clustering method according to claim 2, wherein said value a is a real number that is more than 0.5 and less than 1.

4. The clustering method according to claim 1, wherein said storage media is hard disk storage.

5. A method for clustering in computer accessible storage media, said method comprising the steps of:
   (a) storing a content of a file in a single cluster of said storage media;
   (b) in response to a number of changes or modifications of said file, storing the differences in file space resulting from said changes or modifications in said cluster, so as to accumulate said differences in said cluster; and
   (c) in response to the occurrence of said number of modifications reaching a predetermined number, generating a new cluster and storing the total content of said file in said new cluster of said storage media.

6. A computer system having a storage media which is computer accessible and in which file contents can be clustered, said computer system comprising:
   (a) means for storing a file in a single cluster of said storage media;
   (b) means for modifying the file stored in said single cluster;
   (c) means, responsive to said modification, for accumulating the differences in file space utilized in said media which resulted from said modification in said single cluster; and
   (d) means, responsive to said accumulated differences exceeding a predetermined value for generating a new cluster and stonng the total content of said file in said new cluster of said storage media.

7. The computer system according to claim 6, wherein said predetermined value is S(1+a), where S is the number of bytes of the file which is first to be stored in said single cluster and a is a positive number.

8. The computer system according to claim 7, wherein said value a is a real number that is more than 0.5 and less than 1.

9. The computer system according to claim 6, wherein said storage media is hard disk storage.

10. A method for clustering in computer accessible storage media, said method comprising the steps of:
    (a) storing each of a plurality of files in separate single clusters of said storage media;
    (b) accumulating a sum of differences in storage space used by a said file resulting from modification to any one of said plurality of files to the cluster in which said modified file is stored;
    (c) in response to said sum exceeding a predetermined value of the differences accumulated in any one cluster of a plurality of single clusters which contains said file generating in said storage media a new single cluster separate from said plurality of clusters and storing in said new single cluster the total content of the modified file whose accumulated sum of differences has exceeded said predetermined value; and
    (d) accumulating the sum of differences resulting from further modification to said modified file in said new cluster and determining if said accumulated sum of differences in said new cluster has exceeded said predetermined value.

11. The clustering method according to claim 10, wherein said predetermined value in steps (c) and (d) is S(1+a), where S is the number of bytes of the file which is first to be stored in said single cluster and a is a positive real number.

12. The clustering method according to claim 11, wherein said value a is a real number that is more than 0.5 and less than 1.

13. The clustering method according to claim 10, wherein said storage media is hard disk storage.

14. A computer system having storage media which is computer accessible and can be clustered, said computer system comprising:
    (a) means for creating separate single clusters in said storage media one after another for a plurality of files and storing said plurality of files in the cluster;
    (b) means, responsive to modification to said any one of said files, for accumulating a total difference resulting from said modification to the single cluster in which said modified file is stored;
    (c) means for monitoring the value of said accumulated total differences for each of said plurality of single clusters and, in response to said accumulated total differences exceeding a predetermined value, generating in said storage media a new cluster for storing the total content of the modified the said new cluster; and
    (e) means, responsive to the generation of the new cluster, for performing steps (c) and (d) to monitor said value of accumulated total difference for said new cluster.

15. The computer system according to claim 14, wherein said predetermined value is S(1+a), where S is the number of bytes of the file which is first to be stored in said single cluster and a is a positive real number.

16. The computer system according to claim 15, wherein said value a is a real number that is more than 0.5 and less than 1.

17. The computer system according to claim 14, wherein said storage media is hard disk storage.

18. A computer system for supporting program creation by managing and compiling a plurality of source files, said computer system comprising:

(a) a program database for retaining program information of a plurality of source files in separate single clusters of computer accessible storage media;

(b) means for locating, at the time of compilation, the cluster in said program database in which an object originating from a source file to be processed is stored;

(c) means, responsive to the location of said cluster, for determining the amount of said storage media occupied by said located cluster and in response to the occurrence of said amount of occupied storage media exceeding a predetermined amount, creating a new cluster in said program database and associating it to said source file to be processed;

(d) means for determining, for each object representing the program information of said source file to be processed, if said object is included in the cluster associated with said source file, and, if not, storing said object in said cluster.

19. The computer system according to claim 18, wherein said predetermined size is S(1+a), where S is the number of bytes of the file which is first to be stored in said single cluster and a is a positive real number.

20. The computer system according to claim 18, wherein said value a is a real number that is more than 0.5 and less than 1.

21. The computer system according to claim 18, wherein said storage media is hard disk storage.

* * * * *